United States Patent
Lang et al.

(10) Patent No.: US 9,292,325 B2
(45) Date of Patent: Mar. 22, 2016

(54) MANAGING A VIRTUAL COMPUTER RESOURCE

(71) Applicant: INTERNATIONAL BUSINESS MACHINES CORPORATION, Armonk, NY (US)

(72) Inventors: Jakob C. Lang, Altdorf (DE); Angel Nunez Mencias, Stuttgart (DE); Albert Schirmer, Dettenhausen (DE); Jochen Schweflinghaus, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

(21) Appl. No.: 14/031,073

(22) Filed: Sep. 19, 2013

(65) Prior Publication Data

US 2014/0089922 A1    Mar. 27, 2014

(30) Foreign Application Priority Data

Sep. 25, 2012    (GB) .................................. 1217077.5

(51) Int. Cl.
*G06F 9/455* (2006.01)
*G06F 21/00* (2013.01)
*G06F 21/10* (2013.01)

(52) U.S. Cl.
CPC ........ *G06F 9/45533* (2013.01); *G06F 9/45558* (2013.01); *G06F 21/00* (2013.01); *G06F 21/105* (2013.01)

(58) Field of Classification Search
CPC .................... G06F 2009/45587; G06F 21/604; G06F 21/57; G06F 21/53; G06F 9/50; G06F 9/45533; G06F 9/45558; G06F 21/00; G06F 21/105

USPC ............................................................. 718/1
See application file for complete search history.

(56) References Cited

U.S. PATENT DOCUMENTS

| | | | |
|---|---|---|---|
| 7,412,492 B1 * | 8/2008 | Waldspurger | ................. 709/216 |
| 7,984,108 B2 | 7/2011 | Landis et al. | |
| 8,127,292 B1 | 2/2012 | Dobrovolskiy et al. | |

(Continued)

FOREIGN PATENT DOCUMENTS

| EP | 1612642 A2 | 1/2006 |
|---|---|---|
| WO | WO03/085497 A2 | 10/2003 |
| WO | WO2008124652 A2 | 10/2008 |

OTHER PUBLICATIONS

Frey, J.A., et al., "IBM Unified Resource Manager Introduction and Overview", IBM Journal of Research and Development, vol. 56, Issue 1.2, Jan./Mar. 2012, pp. 16:1-16:10.

(Continued)

*Primary Examiner* — Lewis A Bullock, Jr.
*Assistant Examiner* — Jacob Dascomb
(74) *Attorney, Agent, or Firm* — Margaret A. McNamara, Esq.; Rachel L. Pearlman, Esq.; Heslin Rothenberg Farley & Mesiti P.C.

(57) ABSTRACT

Managing a virtual computer resource on at least one virtual machine. The managing of the virtual computer resource on the at least one virtual machine is by controlling execution of the virtual computer resource on the at least one virtual machine by a virtual machine instance, such as a firmware facility, of a trusted part of a computer system. The virtual machine instance is unique in the computer system.

13 Claims, 8 Drawing Sheets

(56) References Cited

U.S. PATENT DOCUMENTS

| | | |
|---|---|---|
| 8,201,167 B2 | 6/2012 | Anderson et al. |
| 8,230,077 B2 | 7/2012 | Anderson et al. |
| 8,352,941 B1* | 1/2013 | Protopopov ........ G06F 9/45558 718/1 |
| 2002/0013802 A1* | 1/2002 | Mori et al. ................ 709/1 |
| 2004/0031035 A1* | 2/2004 | Shiu ................ G06Q 10/10 718/102 |
| 2004/0215837 A1 | 10/2004 | Abbey et al. |
| 2005/0039183 A1* | 2/2005 | Romero et al. ............. 718/100 |
| 2006/0005198 A1* | 1/2006 | Uchishiba et al. ........... 718/104 |
| 2006/0085785 A1* | 4/2006 | Garrett ...................... 718/1 |
| 2006/0143617 A1* | 6/2006 | Knauerhase et al. ......... 718/104 |
| 2006/0184935 A1* | 8/2006 | Abels et al. ................ 718/1 |
| 2007/0300220 A1* | 12/2007 | Seliger et al. ............... 718/1 |
| 2008/0183626 A1 | 7/2008 | Romero et al. |
| 2008/0250406 A1* | 10/2008 | Carpenter et al. ........... 718/1 |
| 2008/0301673 A1* | 12/2008 | Kawasaki et al. ........... 718/1 |
| 2009/0055831 A1* | 2/2009 | Bauman et al. ............. 718/104 |
| 2009/0089780 A1* | 4/2009 | Johnson et al. ............. 718/1 |
| 2009/0125902 A1* | 5/2009 | Ghosh et al. ............... 718/1 |
| 2009/0265707 A1* | 10/2009 | Goodman et al. ........... 718/1 |
| 2009/0265756 A1 | 10/2009 | Zhang et al. |
| 2009/0328225 A1* | 12/2009 | Chambers et al. ........... 718/1 |
| 2010/0050173 A1* | 2/2010 | Hensbergen ................ 718/1 |
| 2010/0095000 A1* | 4/2010 | Kettler et al. ............... 709/226 |
| 2010/0107160 A1* | 4/2010 | Srinivasan .................. 718/1 |
| 2010/0257602 A1* | 10/2010 | Kettler et al. ............... 718/1 |
| 2010/0306382 A1* | 12/2010 | Cardosa et al. ............. 718/1 |
| 2011/0010714 A1 | 1/2011 | Powell et al. |
| 2011/0072431 A1* | 3/2011 | Cable et al. ................ 718/1 |
| 2011/0093870 A1 | 4/2011 | Sharma et al. |
| 2011/0185062 A1 | 7/2011 | Foege et al. |
| 2011/0296197 A1 | 12/2011 | Konetski et al. |
| 2012/0131578 A1* | 5/2012 | Ciano et al. ................ 718/1 |
| 2012/0174096 A1* | 7/2012 | Conover .................... 718/1 |
| 2012/0174097 A1* | 7/2012 | Levin ........................ 718/1 |
| 2012/0311564 A1* | 12/2012 | Khalid ....................... 718/1 |
| 2013/0198743 A1* | 8/2013 | Kruglick .................... 718/1 |
| 2014/0053245 A1* | 2/2014 | Tosa et al. .................. 726/4 |
| 2014/0058871 A1* | 2/2014 | Marr et al. ................. 718/1 |

OTHER PUBLICATIONS

Verma, Vibhooti, "Strongly Partitioned Real-Time Kernel (SParK)," pp. 1-96, (no date information available); http://citeseerx.ist.psu.edu/viewdoc/download?doi=10.1.1.126.2102&rep=rep1&type=pdf.

Anonymous, "License Management System," The IP.com Prior Art Database, IPCOM000219032D, Jun. 18, 2012, pp. 1-2.

* cited by examiner

MANAGING A VIRTUAL COMPUTER RESOURCE

PRIOR FOREIGN APPLICATION

This application claims priority from United Kingdom patent application number 1217077.5 filed Sep. 25, 2012, which is hereby incorporated herein by reference in its entirety.

BACKGROUND

One or more aspects of the present invention relate in general to data processing systems, and in particular, to managing a virtual computer resource on at least one virtual machine.

In today's information technology infrastructure, many server systems support logical partitioning. Many logical partitions of a logically partitioned system execute operating systems on which applications are deployed. Such applications communicate with applications within the same partition, within the same logically partitioned system, with devices coupled to the logically partitioned system, and with other applications on other systems coupled to the logically partitioned system. The communication protocols required to support such communication must support connection oriented, in-order, reliable, and flow-controlled data delivery. Implementing protocols to meet these requirements leads to resource intensive implementation which requires increased performance. Delivering such performance requires sophisticated and expensive communication hardware. The requirements still remain in place even in virtualized server environments. Another challenge is to secure the communication protocols against surveying attacks of the communication lines or ensuring the availability of the counterpart of the communication.

US 2011/0093870 A1, hereby incorporated herein by reference in its entirety, describes a method in a data processing system for communicating between a plurality of applications. A request is received from an originating application to send data to a destination application. Further a request is sent to identify a location of the destination application to a virtualization management mechanism. It is determined whether the location of the destination application is a second logical partition in the plurality of logical partitions of the logically partitioned data processing system in response to receiving a response from the virtualization management mechanism. A bypass protocol is used to send the request from the originating application to the destination application in response to the location being the second logical partition.

A mechanism is provided for a high performance and resource efficient communication among a plurality of applications running on logical partitions of a logically partitioned system. The performance of the communication is increased by providing a high through-put with a low latency. By increasing the throughput and decreasing latency, the logically partitioned system reduces the processing requirements of the logically partitioned system's components such as processing units, memory, input/output bandwidth, or the like. The mechanism comprises a bypass transport protocol for communicating between logical partitions. Communication software within each operation system executing on the logical partition determines when the bypass transport protocol is to be deployed. Therefore, application programming interfaces (API) are maintained thus supporting existing applications without change and supporting connection oriented, reliable, in-order, and flow-controlled data transfers.

US 2011/0185062 A1, hereby incorporated herein by reference in its entirety, describes a qualitative resource assignment wizard which receives qualitative information for a logical partition (LPAR) and calculates computer resource assignments for the LPAR based on the qualitative information and a set of conversion functions. For example, the qualitative resource assignment wizard may calculate a processing unit assignment, a memory assignment, and an I/O slot assignment for the LPAR. The qualitative information may be input by a user, for example, utilizing a graphical user interface (GUI). Conversion functions are calculated during a training phase, in which a user periodically provides qualitative information while resource usage data is gathered. The wizard may reside in a hardware management console (HMC) or other administrative console and/or may be a component of a hypervisor or other partition management code. Software code associated with the wizard may be provided by a network server application to a client system for enabling a user to remotely input the qualitative information.

BRIEF SUMMARY

In one aspect, a method is provided for managing a virtual computer resource, on at least one virtual machine, in order to enable an efficient and secure way of administrating licensing management information.

Another aspect is to provide a system for managing a virtual computer resource on at least one virtual machine, comprising an efficient and secure way of administrating licensing management information.

Objectives are achieved by the features of aspects of the independent claims. The other claims, the drawings and the specification disclose embodiments of aspects of the invention.

According to one aspect, a capability is provided for managing a virtual computer resource on at least one virtual machine. This management service can be achieved by controlling execution of the virtual computer resource on the at least one virtual machine by a virtual machine instance, preferably a firmware facility, of a trusted part of a computer system, the virtual machine instance being unique in the computer system. A virtual computer resource in this sense covers not only software aspects, as for example a software license, but also hardware resources, as memories, processors or the like, as will be outlined in more detail herein.

BRIEF DESCRIPTION OF THE SEVERAL VIEWS OF THE DRAWINGS

One or more aspects of the present invention together with the objects and advantages may best be understood from the following detailed description of the embodiments, but not restricted to the embodiments, wherein is shown in.

DETAILED DESCRIPTION

Figure 1:
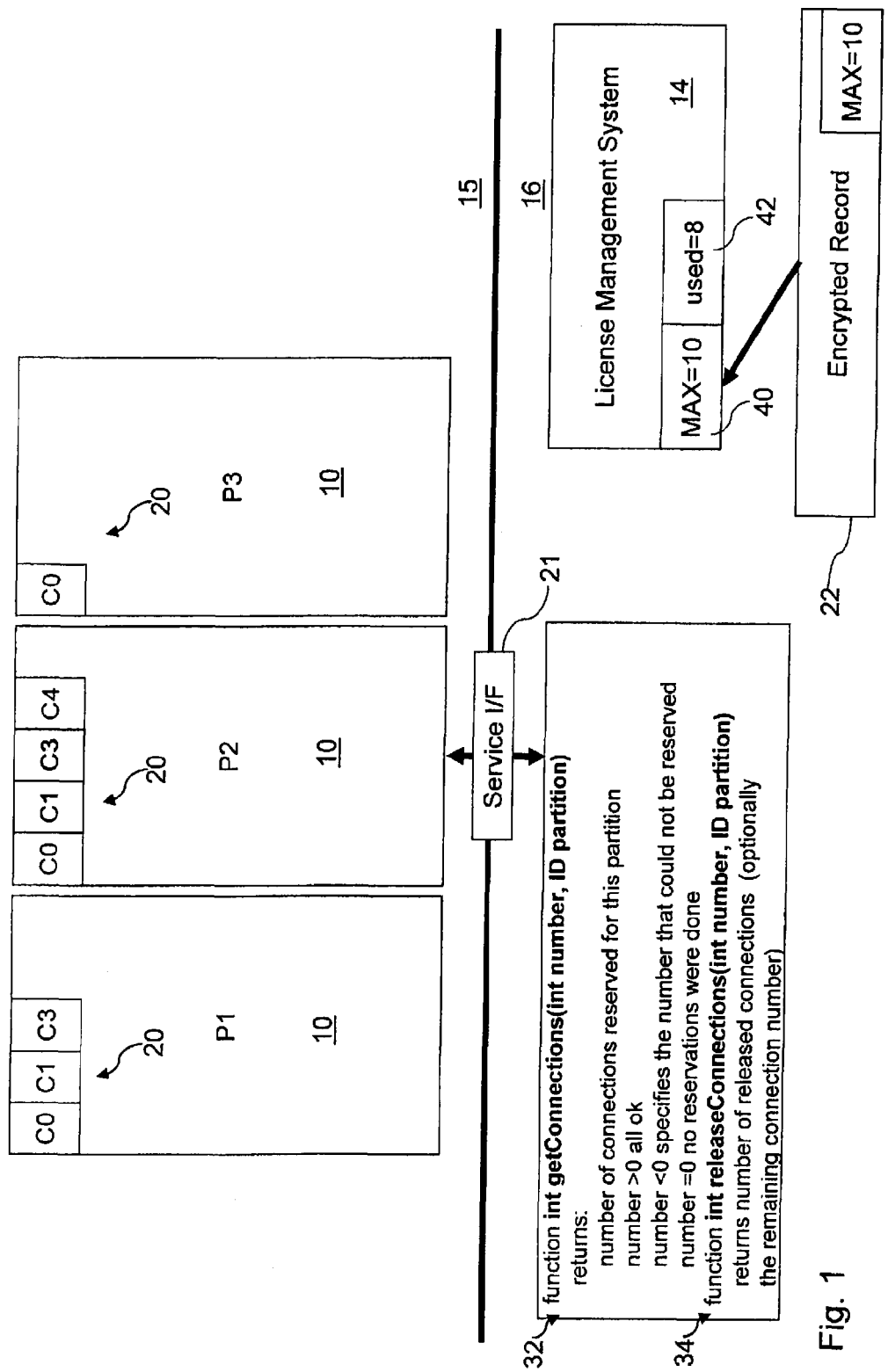
FIG. 1 a general overview of a license management system with three virtual machines according to an example embodiment.

In the drawings, like elements are referred to with equal reference numerals. The drawings are merely schematic representations, not intended to portray specific parameters of aspects of the invention. Moreover, the drawings are intended to depict only typical embodiments, and therefore, should not be considered as limiting the scope of the invention.

For illustrating an aspect, FIG. 1 depicts a general overview of a license management system 14 with three virtual machines according to an example embodiment. FIG. 1 shows a layer 15 with three virtual machines 10, the virtual machines 10 being represented by three partitions P1, P2, P3. Each partition P1, P2, P3 has a different number of virtual computer resources 20 running. The virtual computer resources 20 in each partition P1, P2, P3 are referred to as C0, C1, C2, . . . , and so on. The partitions P1, P2, P3 are connected via a service interface 21 to a hardware/firmware layer 16 of a trusted area of a computer system 212 (FIG. 2), which belongs to a trusted part of a computer system 212 where a license management system 14 (FIG. 1) as a virtual machine instance is implemented. The unique license management system 14 exhibits two encrypted records 40 and 42, where the record 40 covers the maximum allowable number of virtual computer resources 20 and the record 42 covers the number of virtual computers 20 in use. The maximum number 40 is provided to the license management system 14 by an encrypted record 22 from the provider of the virtual computer resource 20, for example. These two records 40, 42 cover the sum of all virtual computer resources 20 of the virtual machines 10. The managing process according to one aspect is performed by executing functions 32, 34 in the firmware system 16 which are transferring information via the service interface 21 to the virtual machines 10. These functions 32, 34 cover adding and releasing processes, respectively, for the virtual computer resources 20, for example. There is available for execution a function getConnections 32, e.g., which transfers the number of requested virtual computer resources 20 as well as the identification of the partition P1, P2, P3 where it is requested as an argument and which gets information back from the partition P1, P2, P3 about the number of virtual computer resources for this partition P1, P2, P3. If the number is greater than zero, then the request is fulfilled. If the number is less than zero, it specifies the number of virtual computer resources, that could not be added and if the number is zero, no virtual computer resource could be added. In the FIG. 1, as in the following Figures, the virtual computer resources are named connections. A second function releaseConnections 34 is available, e.g., which transfers the number of virtual computer resources 20 that are requested to be released to the partitions P1, P2, P3. It has the same arguments as the function getConnections 32, but gets back the number of the released virtual computer resources 20 or optionally the number of the remaining virtual computer resources 20. The described two functions 32, 34 are the basis of managing licensing information between the three partitions 10 and the license management system 14.

The license management system 14 itself may not only be implemented in a hardware/firmware layer of the computer system 212 (FIG. 2) but generally could also be part of a hypervisor, for example. Additionally it also could be a software instance executed on a logical partition of a virtual machine.

A virtual computer resource 20 (FIG. 1) may also be associated to a physical computer resource of the computer system 212 (FIG. 2), such that the physical computer resource is used exclusively by the virtual machine 10. Generally a virtual computer resource 20 (FIG. 1) can at least be one of the following: a software instance, a logical partition, a data processing unit, a main memory, a network interface, a resource of a virtual machine 10.

Figure 2:
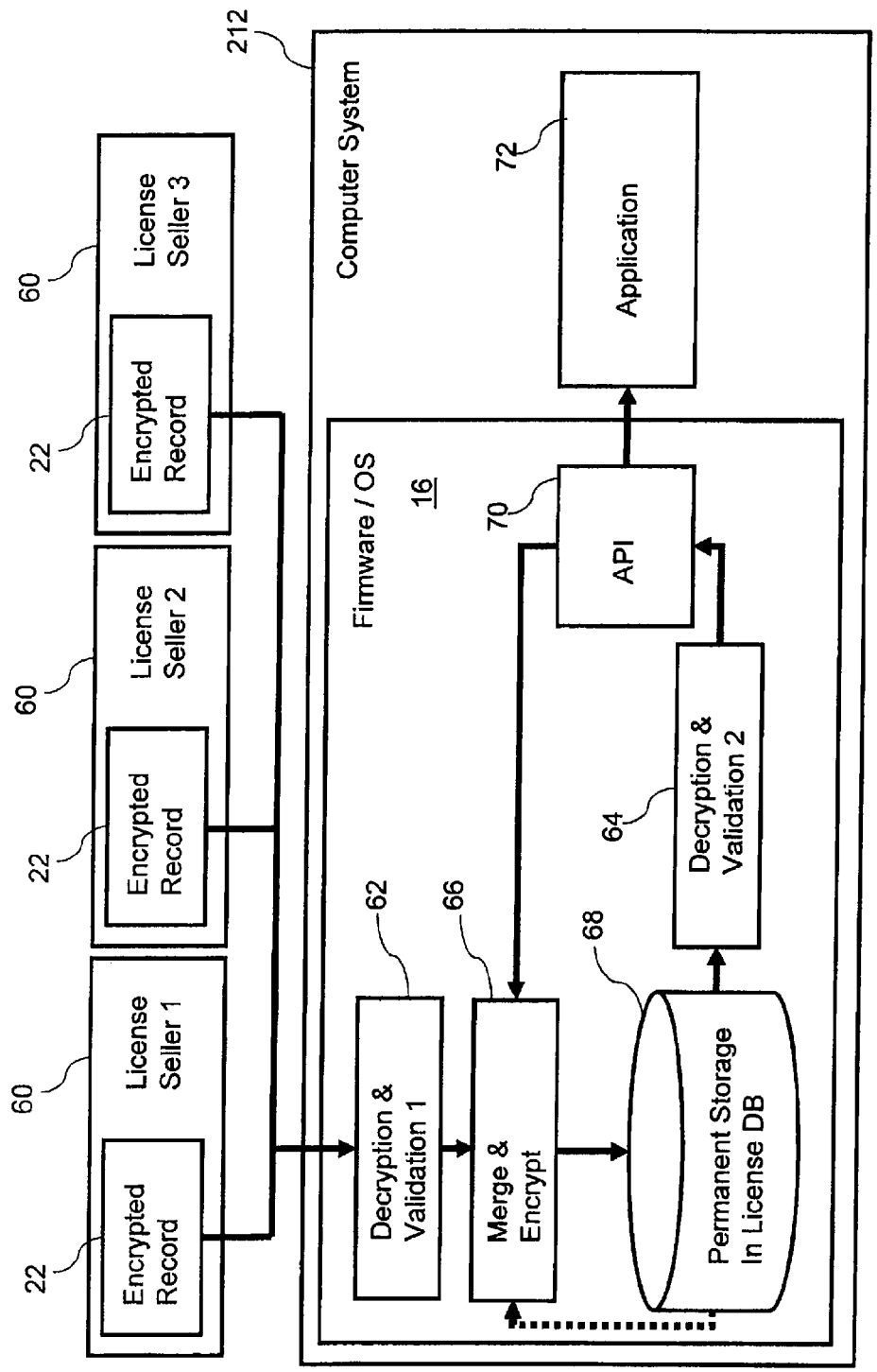
FIG. 2 a detailed overview of a general license management system based on encrypted records.

FIG. 2 illustrates a detailed overview of a general license management system based on encrypted records, as for example published in IP.com Number IPCOM/000219032D entitled "License Management System," electronic publication Jun. 18, 2012, which is hereby incorporated herein by reference in its entirety. A license management system of this kind may serve as a basis for a technique for managing virtual computer resources as described by one or more aspects.

A license management system is described that offers an approach based on encrypted records 22 to control licensing and entitlement for an application 72. The system does not need an external license verification server, so the computer system 212 that requests to use the license does not necessarily need to have an internet connection. The encrypted record 22 is processed on the computer system 212 without any additional requirements from an external resource.

A license key in this license management system consists of a unique identifier and some data associated with this identifier. The data can contain simple entitled/not entitled information (e.g. is the use of a specific application x allowed on this system or not), the number and type of resources allowed (e.g. a specific application y can run on up to five processors and use up to 3 GB of memory), expiration information (e.g. the use of application z is allowed until e.g. Dec. 31, 2012, but not after this date) and more. By using a 'Key-Value-Length' format for the license key, the exact content of the license keys is transparent to the license management system. License keys contain encrypted parts that are created using standard encryption techniques. The keys can come from various sources, e.g. from software or hardware vendors (license sellers 1-3 (60) in FIG. 2), and could be limited to a given computer system or operating system using the system's serial number or some other unique identifier.

The user or a provider may install a license key as an encrypted record 22 on the computer system 212. It is possible to install multiple independent license keys over time. The keys can be loaded via a web interface, typed in via GUI or taken from media (USB stick, CD, . . . ).

The computer system 212 receives the encrypted license keys 22, decrypts and validates them, step 62, (the validation process can e.g. include a check that the key is valid for this system serial number, or that sufficient resources are available in the computer system 212 to run the newly licensed software, etc.). If decryption and validation from step 62 is successful, it stores them in a central secure license repository 68 (permanent storage license database). Multiple license keys can be stored in this license repository 68, and individual license keys can be updated or removed from the repository 68 without affecting the other license keys in the repository 68. The central license repository 68 resides in secure storage which is not accessible to the user, is encrypted, step 66, and therefore protected against tampering. This self contained license database requires no web server access later on to verify a license.

An application programming interface (API) 70 is provided to query license information from the central license database 68. This API 70 can be used by applications 72, the operating system (OS) or even hardware/firmware to determine whether a certain function is allowed, or whether an application 72 may be loaded and for how long it may be used. The API 70 retrieves license information from the license database 68, decrypts and validates it, step 64, and hands it back to the caller. The secure API 70 is protected against manipulation of the results: for example, the database 68—API 70 communication could be secured by decryption, step 64, on each API 70 call or secured by a trusted environment; or the API 70 call could be secured e.g. by a signature. In one embodiment, the API 70 is always available, no network access etc. is required. Depending on the results of the API 70 license query, a certain function may be executed on the computer system 212 or not. Meaningful error messages to the user can be generated by the instance that issued the API 70 license query in case a function is not entitled to run on this computer system 212. In addition, the API 70 license query can be issued repeatedly in certain time intervals to determine license expiration situations and handle them accordingly.

Thus, the described approach provides a secure, self contained license management system with a unique defined API 70 for its users.

Figure 3:
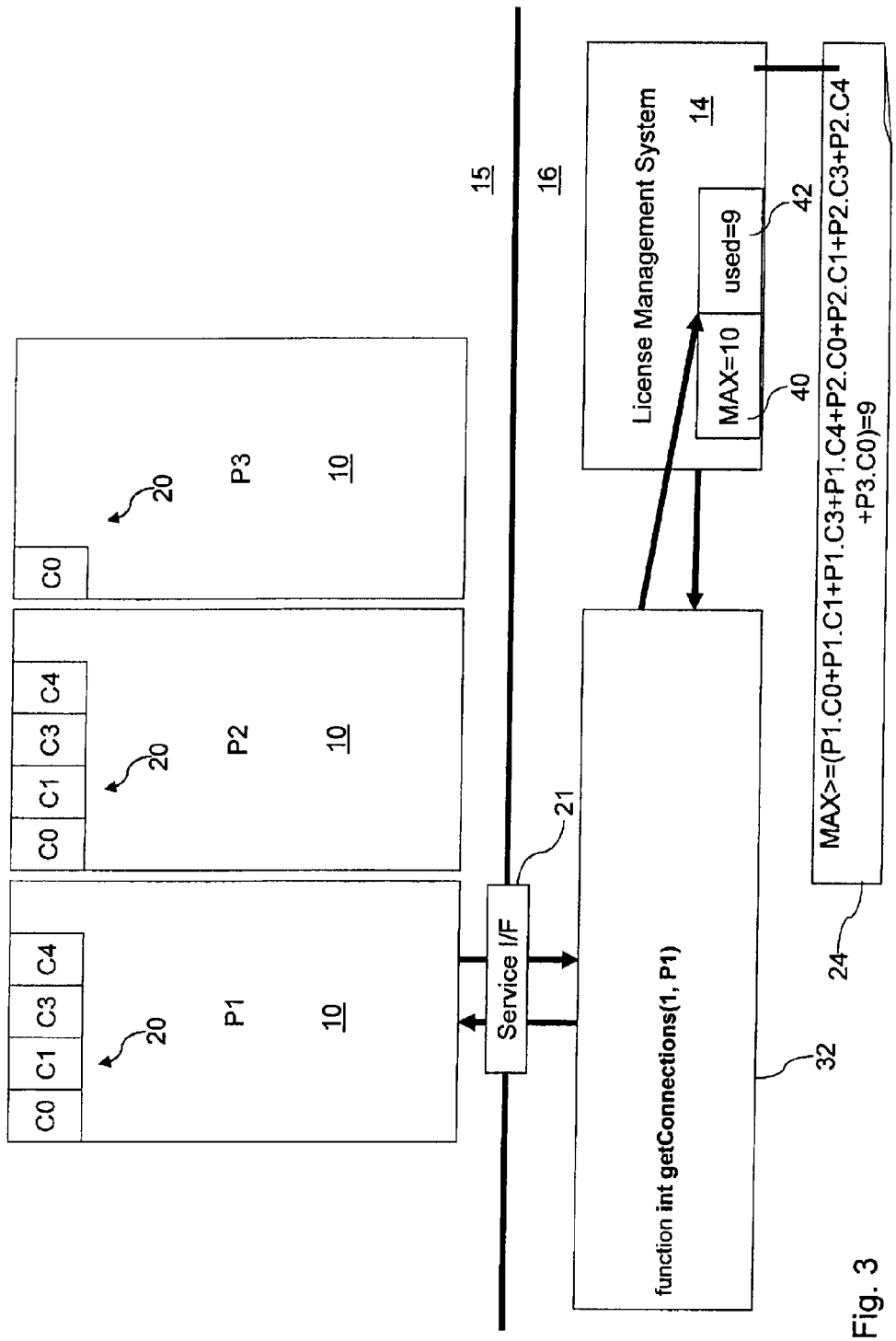
FIG. 3 one example of adding virtual computer resources according to the example embodiment of FIG. 1.

FIG. 3 shows one example of adding virtual computer resources according to the example embodiment of FIG. 1. The function getConnections 32 is issued to add one additional virtual computer resource 20 in partition P1, starting from the state shown in FIG. 1. As the maximum number of virtual computer resources 20 is 10 and the number of virtual computer resources 20 in use is 8, this is a valid request. The request is fulfilled and the answer via the function getConnections 32 is 1. The encrypted record 24 shows then the actual number of virtual computer resources 20 in use, which is 9.

Figure 4:
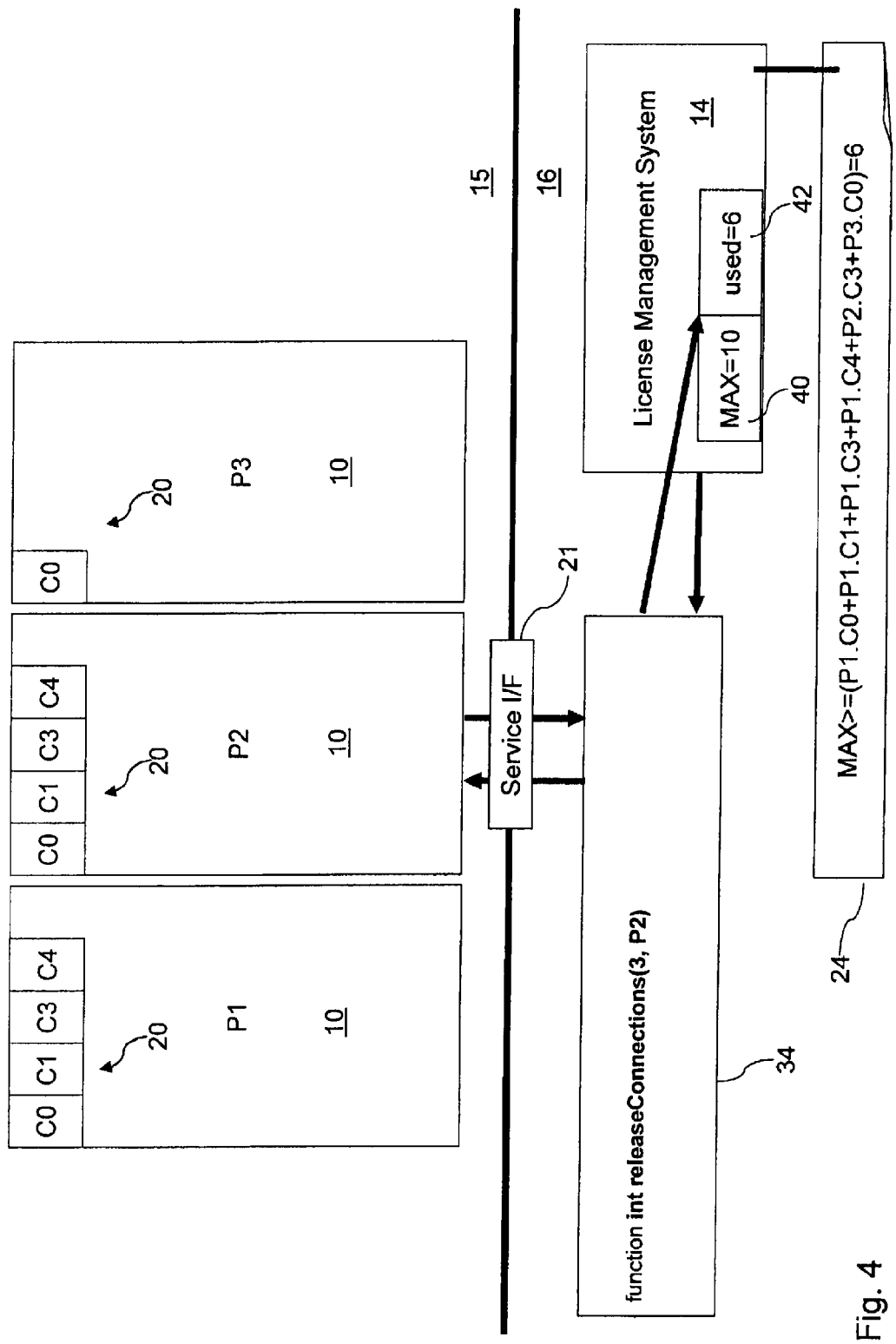
FIG. 4 one example of releasing virtual computer resources according to the example embodiment of FIG. 1.

Further FIG. 4 shows one example of releasing virtual computer resources according to the example embodiment of FIG. 1. In the example shown a request to release three virtual computer resources 20 in partition P2 is issued via function releaseConnections 34. As the number of number of virtual computer resources 20 in use is greater than zero and actually is even 4, this is a valid request. The request is fulfilled and the return number from function releaseConnections 34 is 3. Therefore the encrypted record 24 shows a number of six virtual computer resources 20 in use.

Figure 5:
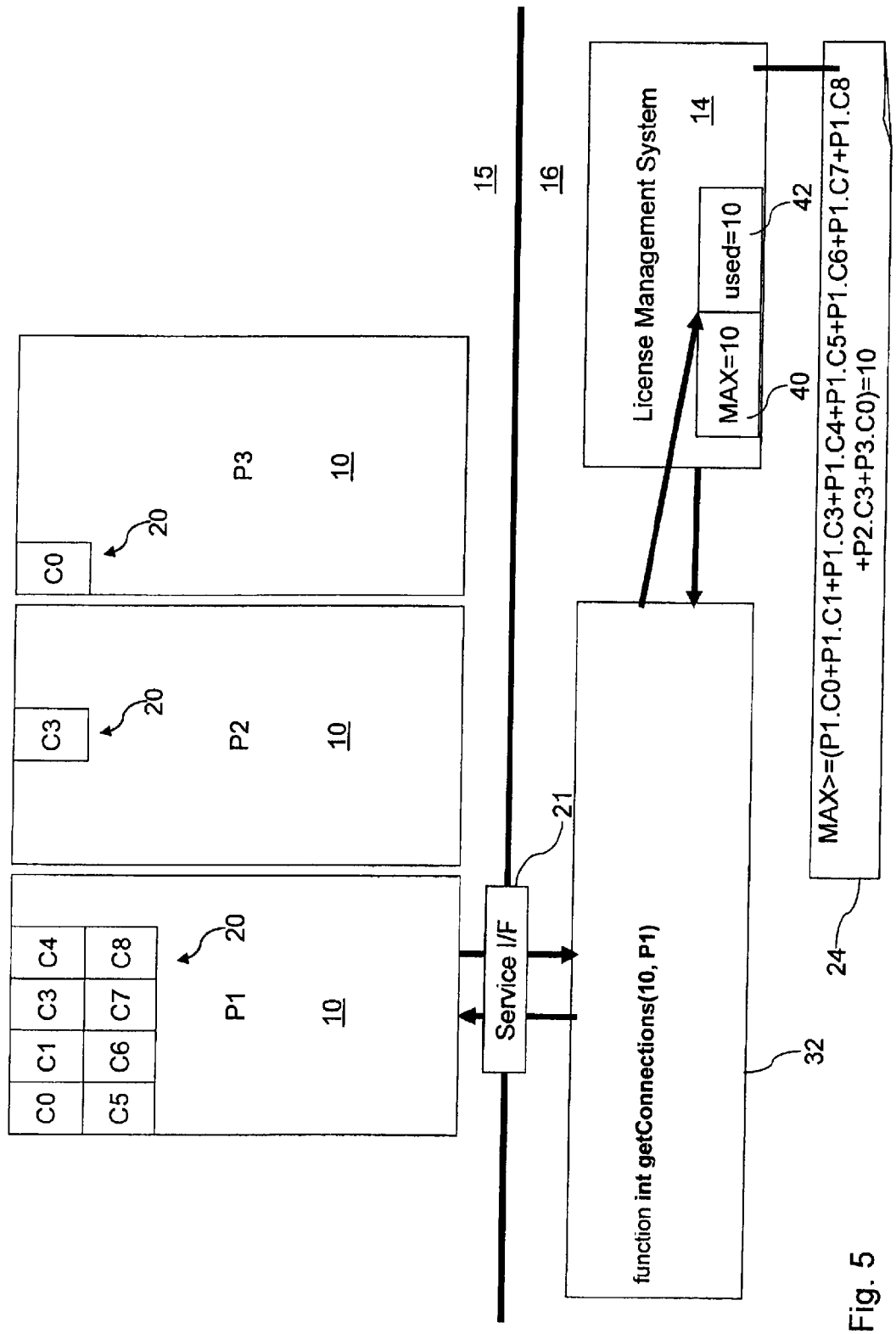
FIG. 5 another example of adding virtual computer resources according to the example embodiment of FIG. 1.

In FIG. 5 another example of adding virtual computer resources according to the example embodiment of FIG. 1 is shown. There a request is issued to add 10 additional virtual computer resources 20 in partition P1. As actually six virtual computer resources 20 are in use in the partitions P1, P2, P3, the maximum number of 10 virtual computer resources 20 would be exceeded. Therefore the number of additionally added virtual computer resources 20 in partition P1 is limited to 4. The result of the function getConnections 32 is −6, according to the definition of the function getConnections 32, given in FIG. 1. The encrypted record 24 shows the number of 10 of ten virtual computer resources 20 in use.

Requests for additional virtual computer resources 20 in partition P1, P2, P3 may also be prioritized by the virtual machine instance 14 in order to manage conflicting requests for a virtual computer resource 20.

Figure 6:
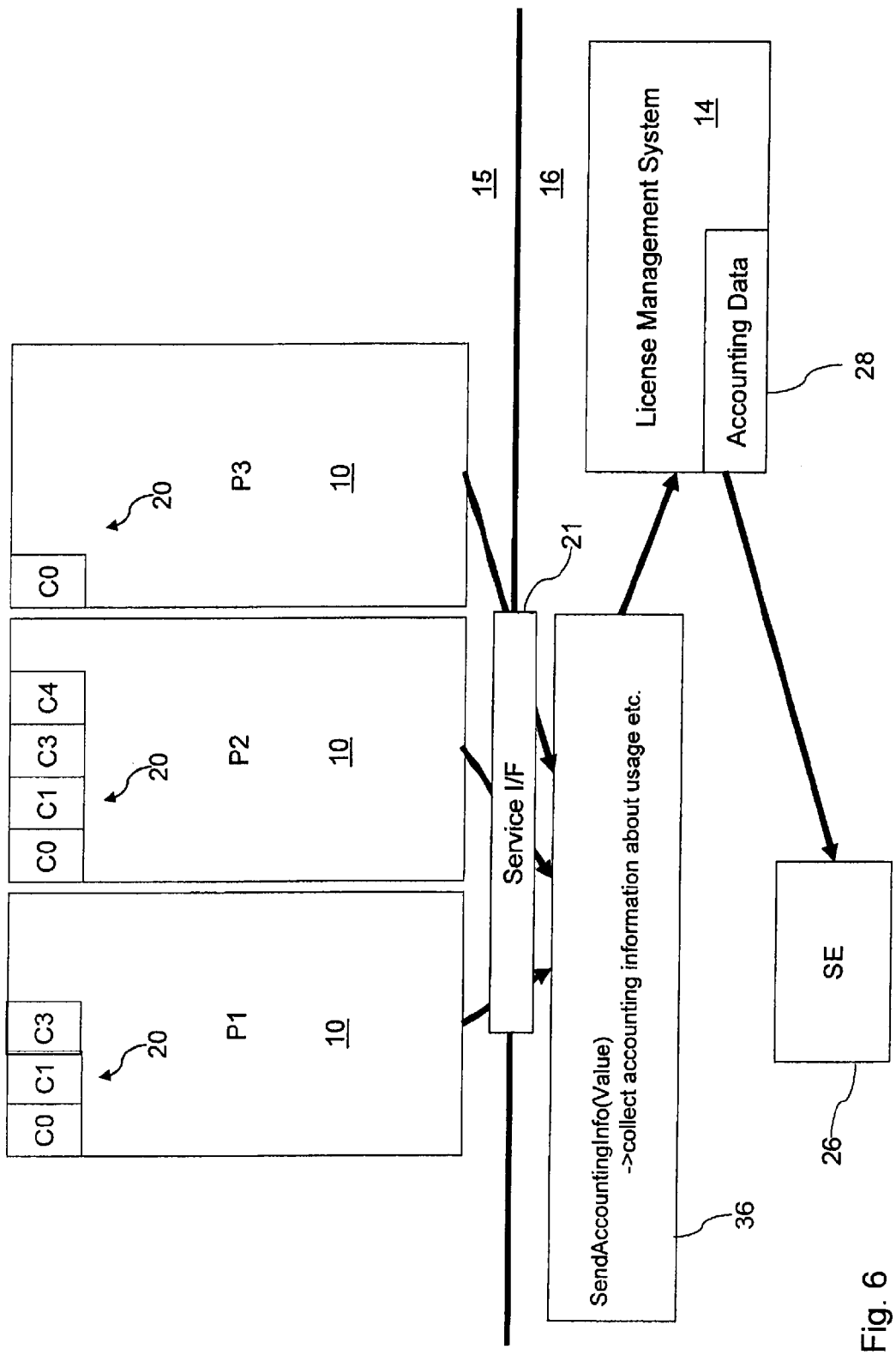
FIG. 6 one example of sending accounting information about virtual computer resources according to the example embodiment of FIG. 1.

FIG. 6 shows one example of sending accounting information about virtual computer resources according to the example of FIG. 1. In this embodiment, a different function SendAccountingInfo 36 collects accounting information from all partitions P1, P2, P3 about the usage of the virtual computer resources 20 in use. This information is transferred to the license management system 14 and stored in an encrypted record 28, which can then be transmitted to a support element 26 in order to be used for accounting management processes as billing, or the like. Such a support element 26 can be such as a laptop, an internet connection and the like, and serve for information exchange with firmware or mainframe systems.

Figure 7:
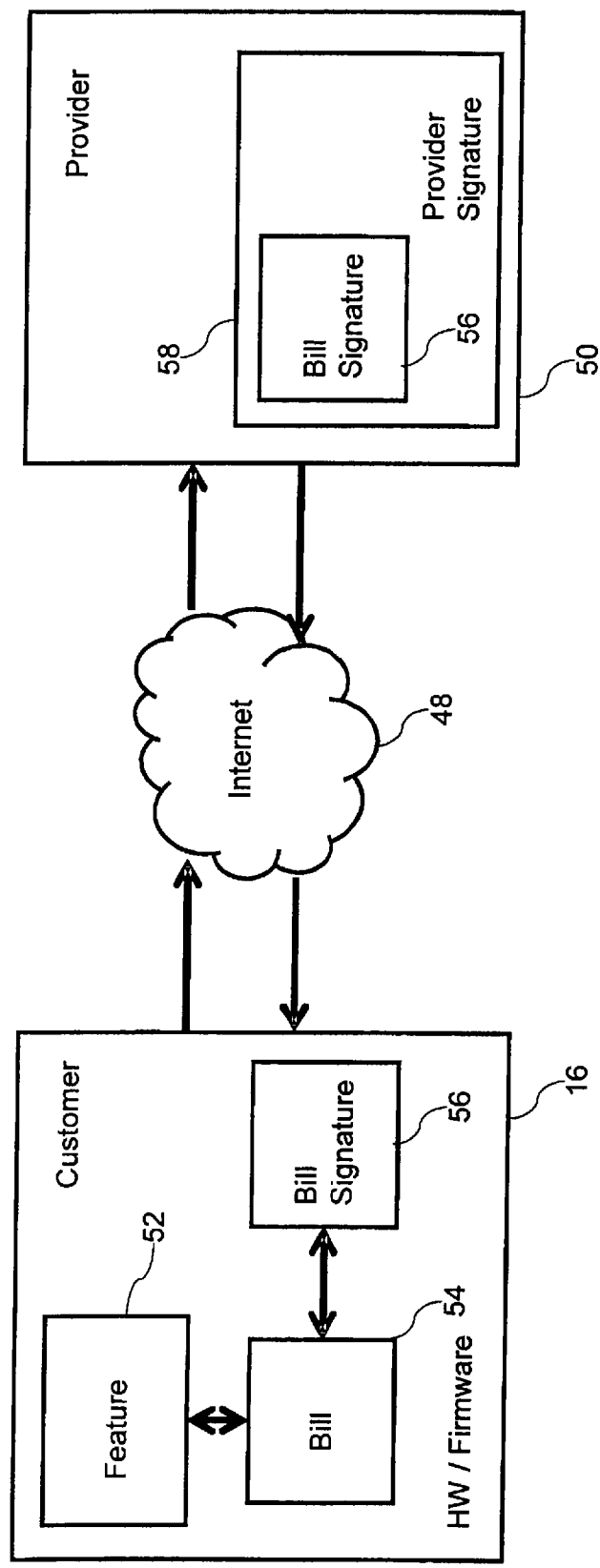
FIG. 7 a general overview about a billing process for the use of virtual computer resources according to an embodiment.

In FIG. 7 a general overview about a billing process for the use of virtual computer resources according to an embodiment is shown. Billing information for using a virtual computer resource, named as feature 52 in FIG. 7, is created in a customer hardware/firmware system 16 according to the method described above. The bill 54 is then provided with a bill signature and transferred via internet 48, for example, to a provider computer system 50. There the bill signature 56 is checked against a provider signature 58 and if validated a bill for using the feature 52 can be sent to the customer. The customer computer system 16 even does not need to be connected to the internet. The transfer process of the billing information to the provider can also be done via USB stick, CD or other media to an external internet connection or directly to the provider computer system 50.

Figure 8:
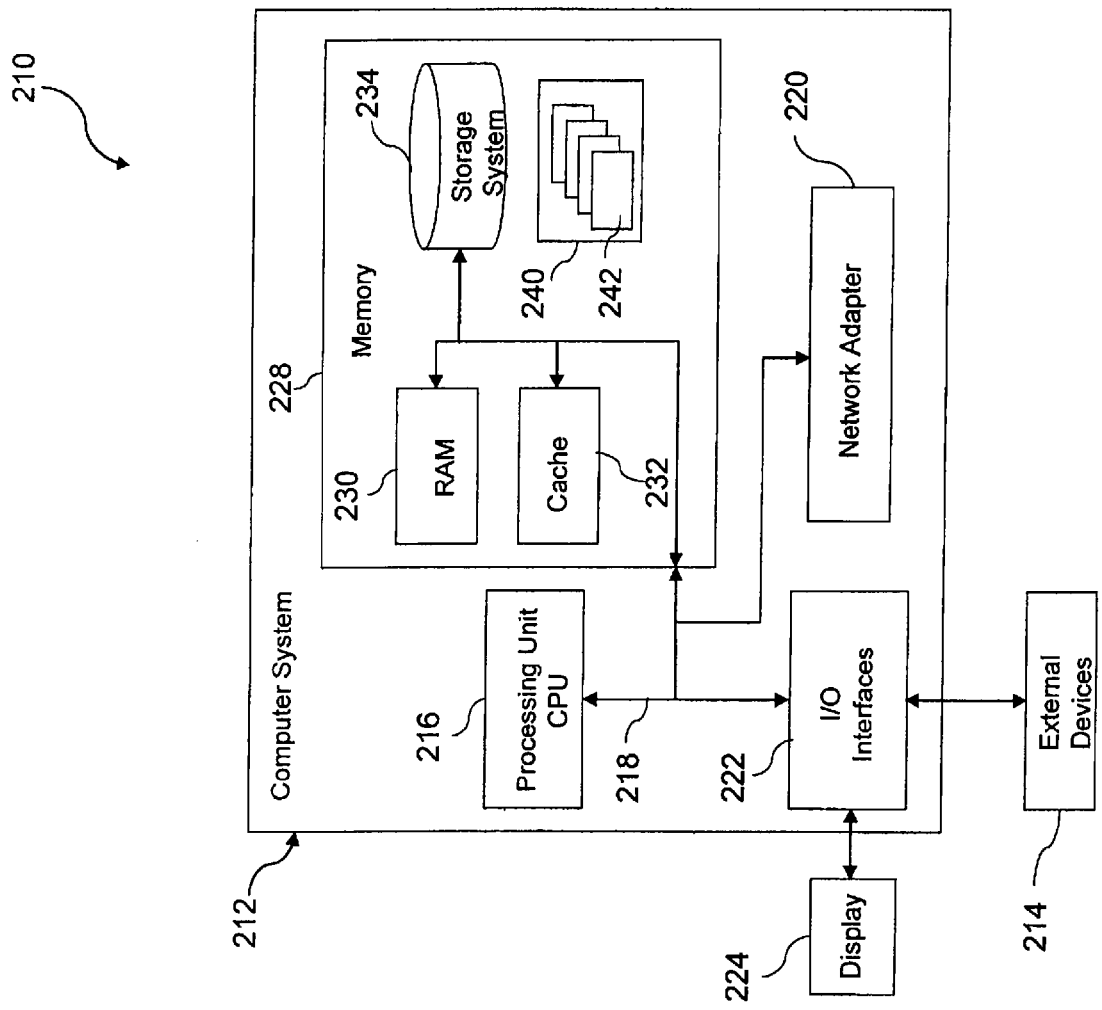
FIG. 8 an example embodiment of a data processing system for carrying out a method according to an embodiment.

Referring now to FIG. 8, a schematic of an example of a data processing system 210 is shown. Data processing system 210 is only one example of a suitable data processing system and is not intended to suggest any limitation as to the scope of use or functionality of embodiments described herein. Regardless, data processing system 210 is capable of being implemented and/or performing any of the functionality set forth herein.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As described herein, according to one aspect, a method is provided for managing a virtual computer resource on at least one virtual machine. This management service can be achieved by controlling execution of the virtual computer resource on the at least one virtual machine by a virtual machine instance, preferably a firmware facility, of a trusted part of a computer system, the virtual machine instance being unique in the computer system. A virtual computer resource in this sense covers not only software aspects, as for example a software license, but also hardware resources, as memories, processors or the like.

A trusted part of a computer system in this sense covers parts of the hardware and software of a computer system that is delivered with the installation of the computer system and cannot be changed by the user. In one embodiment, the trusted part of the computer system part may include one or more of: the hardware, the firmware, a hypervisor and the operating system of the computer system. Using trusted computing designs, the trusted part might also be part of an operating system. This environment represents the trusted part of the computer system and ensures the user to be able to work in a secure and certified way. A trusted environment even extends to cloud computing features of a computing solution.

The virtual machine instance, which may be implemented on a firmware layer of a computer system favorably trusted, can be, in a general sense, a central software instance for other virtual machines or the software running on top of those to manage shared information like resource pools. Thus, it is possible to share information, e.g. counts for the use of a certain software package, between virtual machines in order to establish a secure licensing management system. In the same way it is possible to limit the maximum count of software usage of a certain package up to a limited count, paid for by a user. The virtual machine instance may administrate the usage of a virtual computer resource, like a software package, a network connection, a CPU, any hardware resource by an efficient licensing system. Further, such a virtual machine instance may even be able to manage the temporal aspect of a resource usage by giving a time interval for usage, providing an expiration date, limiting the time wise usage of a license or administrate billing information for the limited usage of any virtual computer resource. Such a method enables the management of a feature or virtual computer resource on demand, which means, that the requested feature or virtual computer resource, like a license or a hardware resource, e.g., may be provided on request for a limited number of resources and/or for a limited time interval. By this way it is possible to control the usage of a virtual computer resource in a very efficient and secure way.

This method is also adapted to handle different virtual computer resources by the same virtual machine instance, as the different virtual computer resources do not necessarily interact with each other. Moreover they can be handled completely in a separate way such that one virtual computer resource has no information about other resources which means that the user also has no information about the usage of the same or other virtual computer resources by other users. Thus, information about the usage of different virtual computer resources may be handled on a strictly confidential basis, a commercially very important aspect.

In one embodiment, there is only one virtual machine instance handling all the managing information on a computer system. Virtual machine instance in the sense used in this description means specifically a virtual machine resource management layer, and not only a logical partition, for example. This unique aspect may also contribute decisively to an efficient and secure way of administrating licensing and/or billing information about virtual computer resources.

In one aspect, the method comprises the following steps of (i) providing the virtual machine instance as an interface between the trusted part of the computer system and the at least one virtual machine, (ii) providing a maximum number of virtual computer resources being available on the computer system for the at least one virtual machine, (iii) providing an actual number of virtual computer resources currently in use on the at least one virtual machine, (iv) providing a first comparison result by comparing the maximum number of virtual computer resources to the actual number of virtual computer resources currently in use, (v) providing a second comparison result by comparing the first comparison result to the number of requested virtual computer resources, and (vi) deciding on adding or not adding one or more of the requested virtual computer resources depending on the second comparison result. Thus, it is possible to manage a limited number of maximal usable virtual computer resources being in a resource pool by providing the relevant information about the limiting numbers or counts of licenses, e.g., and then adding or releasing numbers of virtual computer resources as requested by a user and allowed by a provider of such virtual computer resources. Providing a maximum number of virtual computer resources in this sense may be specifically not only an absolute number of virtual computer resources, but also providing a timeframe or a date where a specific number of virtual computer resources may be used.

In one aspect, if a virtual computer resource is requested by the virtual machine instance and the actual number of virtual computer resources currently in use is less than the maximum number of virtual computer resources, a virtual computer resource may be added dynamically during virtual machine execution. The method thus allows the management of virtual computer resources in a very efficient way during execution of other resources like other virtual machines of the computer system without any hindering of the running system.

The same advantage holds, if a virtual computer resource is requested by the virtual machine instance to be released and the actual number of virtual computer resources currently in use is greater than zero. Then a virtual computer resource may be released dynamically during virtual machine execution without disturbing the current execution of other virtual machine activities on the computer system.

In embodiments, as mentioned above, the virtual machine instance may be implemented on one of a hypervisor, a firmware layer, or a hardware layer of the computer system. As long as the virtual machine instance lies in the trusted part of a computer system, all the advantages of a secure way of handling managing information about usage of the virtual computer resources hold.

Thus, the virtual machine instance is adapted to be implemented as a license management system of the computer system, because it is possible to manage all necessary information like counts of usage, time of usage, maximum count of licenses by such a virtual machine instance in an efficient and secure way to handle.

In one aspect, the virtual computer resource may be a software instance executed on a logical partition of a virtual machine. The described feature of on demand service of one aspect is adapted to act as a central instance for managing shared information between different partitions of one or more virtual machines.

In one embodiment, said method further comprises the following steps of (i) fetching a maximum number of available computer resources from the virtual machine instance, (ii) in case of requesting a virtual computer resource and the actual number of used virtual computer resources being less than the maximum number of virtual computer resources, setting a request for the virtual computer resource to the virtual machine instance and receiving a number of available virtual computer resources, and (iii) in case of requesting a virtual computer resource to be released and the actual number of virtual computer resources currently in use being greater than zero, setting a request for releasing the virtual computer resource to the virtual machine instance and receiving a number of released virtual computer resources. By this way it is ensured that the allowed number of virtual computer resources is not exceeded and that on the other hand the user always gets feedback information about the status of the action the user requested thus being able to continue or change the execution of the virtual computer resources.

In one aspect, the virtual computer resource may also be associated to a physical computer resource of the computer system, such that the physical computer resource is used exclusively by the virtual machine. The described aspect is in the same way able to cover requests for physical computer resources, for example hardware devices like network connections, CPUs, storage devices or the like.

Particularly, a virtual computer resource may at least be one of the following: a software instance, a logical partition, a data processing unit, a main memory, a network interface, a resource of a virtual machine.

A further aspect of the described technique is that a request for a virtual computer resource may be prioritized by the virtual machine instance in order to manage conflicting requests for a virtual computer resource. Thus, a specific virtual machine or a specific user may be served with higher priority than other virtual machines or users, for example, because they are suited to handle tasks with higher priority than others or because they have to serve production systems or the like.

One aspect is that accounting data for a virtual computer resource may be managed by the virtual machine instance. As the virtual machine instance may be implemented as part of a licensing management system for administrating software licenses for example, the managing of accounting data is a major task for such a system and one of the premises for a billing system.

Therefore, the virtual machine instance may also be realized as a billing system for the use of the virtual computer resources, because it is able to handle all the necessary accounting and usage information.

These information data may be transferred in a secure way to a provider of the virtual computer resources used, verified that the transmission has taken place and serve as a basis for billing the use of the virtual computer resource.

Such a billing system may be implemented in the trusted part of a computer system, because obviously information about usage and billing are confidential data and separated from public information access.

According to further aspects, a data processing program for execution in a data processing system comprises an implementation of an instruction set for performing a method as described herein when the data processing program is run on a computer.

Further, a computer program product comprises a computer usable medium including a computer readable program, wherein the computer readable program when executed on a computer causes the computer to perform a method comprising the steps of (i) providing the virtual machine instance as an interface between the trusted part of the computer system and the at least one virtual machine, (ii) providing a maximum number of virtual computer resources being available on the computer system for the at least one virtual machine, (iii) providing an actual number of virtual computer resources currently in use on the at least one virtual machine, (iv) providing a first comparison result by comparing the maximum number of virtual computer resources to the actual number of virtual computer resources currently in use, (v) providing a second comparison result by comparing the first comparison result to the number of requested virtual computer resources, and (vi) deciding on adding or not adding one or more of the requested virtual computer resources depending on the second comparison result.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Rash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

In a further aspect, a data processing system for execution of a data processing program is provided, comprising software code portions for performing a method described herein.

The block diagrams in the figures illustrate the architecture, functionality, and operation of possible implementations of systems, methods and computer program products according to various embodiments. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A method of managing virtual computer resources on at least one virtual machine of a computer system, the method comprising:
   obtaining an indication, by a virtual machine instance in a trusted part of the computer system, of a virtual computer resource to be controlled, wherein the indication identifies the virtual computer resource;
   controlling execution of the virtual computer resource on the at least one virtual machine by the virtual machine instance, the virtual machine instance being unique in the computer system, wherein the at least one virtual machine is not in the trusted part of the computer system;

providing, using the virtual machine instance as an interface, communication between the trusted part of the computer system and the at least one virtual machine;

providing, in an encrypted record in the trusted part of the computer system, a maximum number of virtual computer resources being available on the computer system for the at least one virtual machine, wherein the encrypted record was provided to the trusted part of the computer system by a provider of the virtual computer resource;

providing, by the provider of the virtual machine resource, in the encrypted record, an actual number of virtual computer resources currently in use on the at least one virtual machine;

providing, by the virtual machine instance, a first comparison result by comparing the maximum number of virtual computer resources to the actual number of virtual computer resources currently in use;

providing, by the virtual machine instance, a second comparison result by comparing the first comparison result to a number of requested virtual computer resources; and allocating, by the virtual machine instance, one or more requested virtual computer resources to the at least one virtual machine, when the second comparison result indicates that the number of requested resources is less than the difference of the maximum number of virtual computer resources and the actual number of virtual computer resources currently in use.

2. The method according to claim 1, wherein based on a requested virtual computer resource being requested by the virtual machine instance and the actual number of virtual computer resources currently in use being less than the maximum number of virtual computer resources, adding the requested virtual computer resource dynamically during virtual machine execution.

3. The method according to claim 1, wherein based on a selected virtual computer resource being requested by the virtual machine instance to be released and the actual number of virtual computer resources currently in use being greater than zero, releasing the selected virtual computer resource dynamically during virtual machine execution.

4. The method according claim 1, wherein the virtual machine instance is implemented on a hypervisor, a firmware layer, a hardware layer of the computer system or a combination thereof.

5. The method according to claim 1, wherein the virtual machine instance is a license management system of the computer system.

6. The method according to claim 1, wherein the virtual computer resource is at least one of the following:
a software instance, a logical partition, a data processing unit, a main memory, a network interface, a resource of a virtual machine, or a software instance executed on a logical partition of a virtual machine.

7. The method according claim 1, further comprising:
fetching the maximum number of available computer resources from the virtual machine instance;
based on requesting the virtual computer resource and the actual number of used virtual computer resources being less than the maximum number of available computer resources, setting a request for the virtual computer resource to the virtual machine instance and receiving a number of available virtual computer resources; and
based on requesting the virtual computer resource to be released and the actual number of virtual computer resources currently in use being greater than zero, setting a request for releasing the virtual computer resource to the virtual machine instance and receiving a number of released virtual computer resources.

8. The method according to claim 1, wherein the virtual computer resource is associated to a physical computer resource of the computer system, such that the physical computer resource is used exclusively by the virtual machine.

9. The method according to claim 1, wherein a request for a virtual computer resource is prioritized by the virtual machine instance in order to manage conflicting requests for the virtual computer resource.

10. The method according to claim 1, wherein accounting data for the virtual computer resource is managed by the virtual machine instance.

11. The method according to claim 1, wherein the virtual machine instance is realized as a billing system for the use of virtual computer resources.

12. The method according to claim 11, wherein billing information is securely transmitted to a resource provider and verified that the transmission has taken place.

13. The method according to claim 12, wherein the resource provider is implemented in the trusted part of the computer system.

* * * * *